(12) United States Patent
Shin et al.

(10) Patent No.: US 10,511,070 B2
(45) Date of Patent: Dec. 17, 2019

(54) COOLING PLATE FOR WEIGHT LIGHTENING, BATTERY MODULE COMPRISING THE SAME AND METHOD FOR MANUFACTURING THE SAME

(71) Applicant: LG CHEM, LTD., Seoul (KR)

(72) Inventors: Eun-Gyu Shin, Daejeon (KR); Hang-June Choi, Daejeon (KR); Jeong-O Mun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 234 days.

(21) Appl. No.: 15/579,699

(22) PCT Filed: May 12, 2016

(86) PCT No.: PCT/KR2016/005020
§ 371 (c)(1),
(2) Date: Dec. 5, 2017

(87) PCT Pub. No.: WO2016/204409
PCT Pub. Date: Dec. 22, 2016

(65) Prior Publication Data
US 2018/0175468 A1 Jun. 21, 2018

(30) Foreign Application Priority Data
Jun. 18, 2015 (KR) .................. 10-2015-0086865

(51) Int. Cl.
*H01M 10/6554* (2014.01)
*H01M 10/6556* (2014.01)
(Continued)

(52) U.S. Cl.
CPC ......... *H01M 10/6554* (2015.04); *H01M 2/10* (2013.01); *H01M 2/1016* (2013.01);
(Continued)

(58) Field of Classification Search
None
See application file for complete search history.

(56) References Cited

U.S. PATENT DOCUMENTS

2002/0076515 A1\* 6/2002 Maeyama ............... C25D 5/56
428/35.8
2005/0233148 A1 10/2005 Fares-Karam
(Continued)

FOREIGN PATENT DOCUMENTS

CN 101397656 A 4/2009
CN 202507618 U 10/2012
(Continued)

OTHER PUBLICATIONS

International Search Report for PCT/KR2016/005020 dated Sep. 6, 2016.

*Primary Examiner* — Alix E Eggerding
(74) *Attorney, Agent, or Firm* — Birch, Stewart, Kolasch & Birch, LLP

(57) ABSTRACT

Provided is a cooling plate having excellent cooling performance and a low weight, a battery module including the same, and a method for manufacturing the same. The cooling plate is interposed between a cooling unit that is in thermal contact with battery cells on at least one surface of a stack of battery cells and the battery cells, and includes a metal plating layer on the surface of a substrate made of a synthetic resin.

20 Claims, 6 Drawing Sheets

(51) Int. Cl.
  *H01M 2/10*      (2006.01)
  *H01M 10/6551*   (2014.01)
  *H01M 10/613*    (2014.01)

(52) U.S. Cl.
  CPC ..... *H01M 10/613* (2015.04); *H01M 10/6551* (2015.04); *H01M 10/6556* (2015.04)

(56) References Cited

U.S. PATENT DOCUMENTS

2012/0301769 A1* 11/2012 Okada ................ H01M 2/1077
                                                                429/120
2013/0164578 A1   6/2013 Sweet et al.
2014/0234691 A1   8/2014 Lee et al.

FOREIGN PATENT DOCUMENTS

| | | |
|---|---|---|
| DE | 10 2010 005 154 A1 | 7/2011 |
| JP | 2011-96465 A | 5/2011 |
| KR | 10-1988-0004138 A | 6/1988 |
| KR | 10-2011-0123119 A | 11/2011 |
| KR | 10-2013-012390 A | 11/2013 |
| KR | 10-1496523 B1 | 2/2015 |
| KR | 10-2015-0036897 A | 4/2015 |
| WO | WO 2011/089121 A1 | 7/2011 |

* cited by examiner

COOLING PLATE FOR WEIGHT LIGHTENING, BATTERY MODULE COMPRISING THE SAME AND METHOD FOR MANUFACTURING THE SAME

TECHNICAL FIELD

The present disclosure relates to a battery module and a constitutional part thereof. More particularly, the present disclosure relates to a battery module including a stack of battery cells including electrode assemblies having cathode plates, separators and anode plates, wherein the battery cells are cooled by a cooling member mounted on at least one surface of the stack, and a cooling plate as a heat bridge which connects the battery cells with the cooling member. Specifically, the present disclosure relates to a cooling plate, a battery module including the same and a method for manufacturing a cooling plate. The present application claims priority to Korean Patent Application No. 10-2015-0086865 filed on Jun. 18, 2015 in the Republic of Korea, the disclosures of which are incorporated herein by reference.

BACKGROUND ART

Secondary batteries capable of charging/discharging have been used widely as energy sources for wireless mobile devices. In addition, secondary batteries have been given many attentions as power sources for electric vehicles (EV) and hybrid electric vehicles (HEV) suggested as solutions for overcoming air pollution caused by general gasoline vehicles and diesel vehicles using fossil fuel.

Since middle- and large-size devices such as vehicles require high-output large-capacity power sources, a battery module having a plurality of battery cells electrically connected with each other and a middle- and large-size battery pack including the same as a unit module are used. Such a battery module and a battery pack are provided with a small size and low weight preferably, and thus a prismatic battery and pouch-type battery, which can be stacked with high density and have a low weight as compared to capacity, are used mainly as a unit cell for a battery module. Particularly, since a pouch-type battery using an aluminum laminate sheet or the like as a case has a low weight, requires low manufacturing cost and allows easy deformation, it has been given many attentions.

Battery cells forming a battery module generates a large amount of heat during charging/discharging. Particularly, a laminate sheet of a pouch-type battery used widely for a high-output large-capacity battery module and battery pack is surface-coated with a polymer material having low thermal conductivity, and thus is not effective for cooling the temperature of the whole battery cell. When the heat of a battery module generated during charging/discharging is not removed effectively, heat accumulation occurs, resulting in deterioration of the battery module. In some cases, this causes ignition or explosion of the battery module. Therefore, a cooling member is required essentially for cooling the battery cells embedded in such a high-output large-capacity battery module and a battery pack including the same.

In general, a battery module is manufactured by stacking a plurality of battery cells with high density and the adjacent battery cells are spaced apart from each other by a predetermined interval in order to remove the heat generated during charging/discharging. For example, battery cells are spaced apart from each other by a predetermined interval and stacked successively without any additional members. Otherwise, in the case of battery cells having low mechanical rigidity, one or a combination of at least two battery cells are embedded in a cartridge and then a plurality of such cartridges are stacked to provide a battery module.

In order to remove the heat accumulated in such stacked battery cells effectively, a heat transfer member that is in thermal contact with the battery cells, and a water cooling type or air cooling type cooling unit configured to remove the heat absorbed by the heat transfer member are used. The heat transfer member is a heat bridge by which the batteries are connected with the cooling unit and transfers the heat to the cooling unit so that the temperature of the battery cells may be reduced. A typical example of the heat transfer member is a metal-only cooling plate having high thermal conductivity.

FIG. 1 shows a cooling plate applied to a conventional battery module.

As shown in FIG. 1, the cooling plate 20 is provided so that it may be in thermal contact with the stacked cells 10. Thus, heat transfer is carried out from the battery cells 10 to the cooling plate 20, and the heat transferred to the cooling plate 20 is removed by a cooling unit (not shown). The conventional cooling plate 20 is generally manufactured by using an aluminum (Al) material.

Meanwhile, as mentioned above, a battery module and a battery pack are provided preferably with a small size and low weight. Thus, it is required to reduce not only the weight of a battery cell itself but also the weight of a part such as a heat transfer member or cooling unit configured to cooling the battery cell. However, the conventional cooling plate made of aluminum causes an increase in weight due to aluminum. Therefore, it is required to improve this in view of weight reduction of a battery module.

DISCLOSURE

Technical Problem

The present disclosure is designed to solve the problems of the related art, and therefore the present disclosure is directed to providing a cooling plate having excellent cooling performance and a low weight, a battery module including the same and a method for manufacturing the same.

Technical Solution

In one aspect of the present disclosure, there is provided a cooling plate interposed between a cooling unit that is in thermal contact with battery cells on at least one surface of a stack of battery cells and the battery cells, and including a metal plating layer on the surface of a substrate made of a synthetic resin.

According to an embodiment, the synthetic resin in the cooling plate may be any one of ABS, ABS-PC and PA resins and the metal may be at least one of nickel (Ni), copper (Cu) and chromium (Cr).

According to another embodiment, the substrate of the cooling plate may be processed so that an air flow path may be formed.

In another aspect of the present disclosure, there is also provided a battery module including: a stack of battery cells in which battery cells are stacked; a cooling unit that is in thermal contact with the battery cells on at least one surface of the stack of battery cells; and a cooling plate interposed between the cooling unit and the battery cells, wherein the cooling plate includes a metal plating layer on the surface of a substrate made of a synthetic resin.

According to still another embodiment, the battery module may further include a thermal pad provided on a thermal interface formed among the stack of battery cells, cooling unit and the cooling plate.

According to still another embodiment, the battery module may further include cooling fins interposed at the interface of the battery cells and having their ends protruding out of either lateral surface or both lateral surfaces of the stack of battery cells, and the cooling plate is mounted to the protruding ends of the cooling fins.

According to still another embodiment, the battery cells have cathode terminals and anode terminals protruding out of one side of the outer circumferential surface thereof, or have cathode terminals protruding out of one side of the outer circumferential surface and anode terminals protruding out of the opposite side of the outer circumferential surface, and the ends of the cooling fins protrude in a direction perpendicular to the protruding direction of the cathode terminals and anode terminals.

According to still another embodiment, the battery cells may be plate-like battery cells and form a stack of battery cells by being stacked and arranged so that either side or both sides of one battery cell face to the adjacent battery cell.

According to still another embodiment, the plate-like battery cells may be pouch-type battery cells having a structure in which electrode assemblies are enclosed in a battery casing of a laminate sheet including a resin layer and a metal layer and the outer circumferential surface of the battery casing is sealed by heat sealing, wherein the heat sealed outer circumferential surface of the pouch-type battery cells fix each of the battery cells so that it may be fixed between cartridges forming the stack of battery cells.

In still another aspect of the present disclosure, there is also provided a method for manufacturing a cooling plate interposed between a cooling unit that is in thermal contact with battery cells on at least one surface of a stack of battery cells and the battery cells, the method including the steps of: pretreating the surface of a substrate made of a synthetic resin; and carrying out metal plating to form a metal plating layer on the surface of the substrate.

According to an embodiment, the method for manufacturing a cooling plate may further include a step of carrying out press molding or injection molding to form an air flow path in the substrate.

According to another embodiment, the pretreating step may be a defatting, etching and adsorption of catalyst step.

According to still another embodiment, the catalyst may be Sn/Pd colloid.

According to still another embodiment, the synthetic resin may be ABS resin, and the etching step may be carried out by eluting butadiene ingredient out of the ABS resin to form anchor holes on the surface of the synthetic resin.

According to still another embodiment, the defatting step may use sulfuric acid, the etching step may use a mixture of anhydrous chromic acid with sulfuric acid, and the adsorption of catalyst step may use a mixture of tin chloride, palladium chloride and hydrochloric acid.

According to still another embodiment, the metal plating step may be carried out by electroless nickel plating and a mixture of nickel sulfate, malic acid, succinic acid, sodium hypophosphate and thiourea may be used as a plating solution.

According to still another embodiment, the metal plating step may be carried out by copper plating, nickel plating and chromium plating, successively.

According to yet another embodiment, the metal plating step may be carried out by copper plating, semi-bright nickel plating, bright nickel plating, microporous nickel plating and chromium plating, successively.

Advantageous Effects

The present disclosure gives the following effects. A metallic cooling plate of the conventional battery module is substituted with a light synthetic resin (plastic) material to which a thermal conduction function is provided through metal plating. As a result, it is possible to ensure cooling performance and to accomplish weight lightening.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
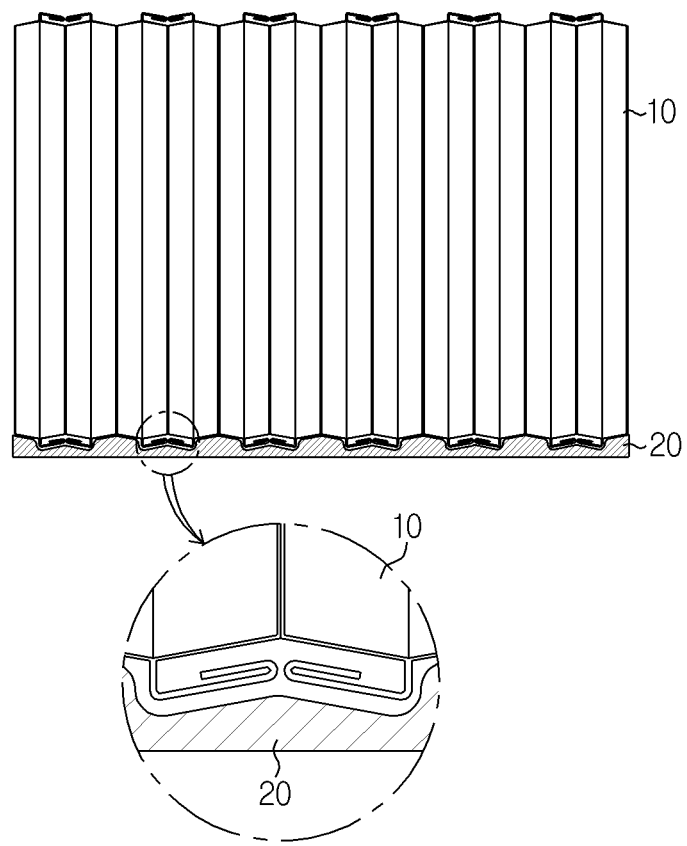
FIG. 1 shows a cooling plate applied to the conventional battery modules.
Figure 2:
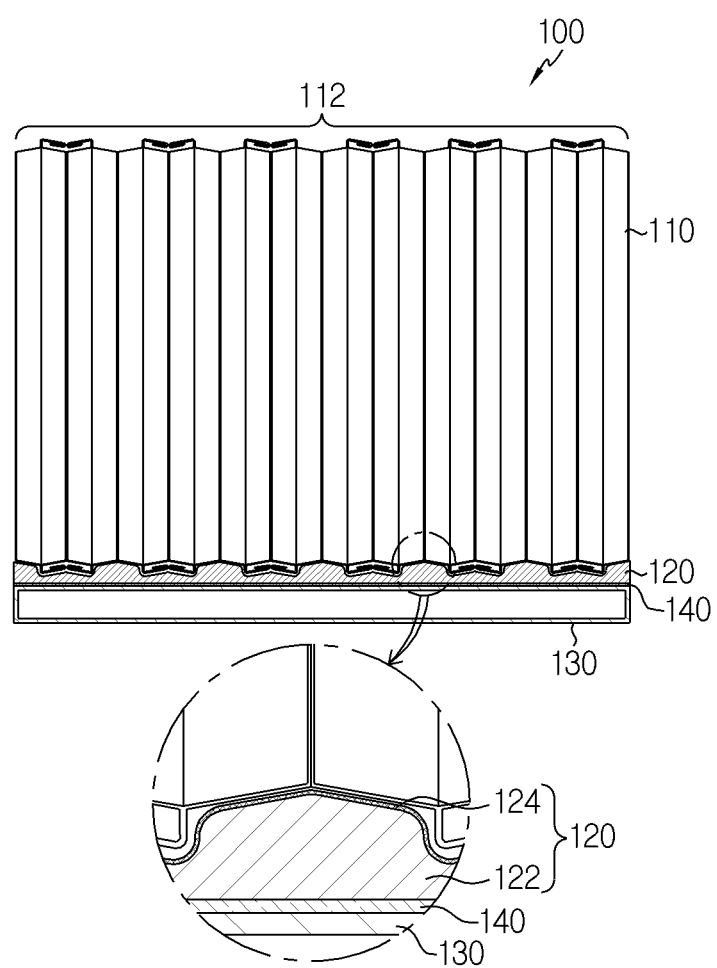
FIG. 2 is a schematic view illustrating a cooling plate according to an embodiment of the present disclosure and a battery module including the same.

FIG. 2 is a schematic view illustrating a cooling plate according to an embodiment of the present disclosure and a battery module including the same.

Referring to FIG. 2, the battery module 100 according to an embodiment of the present disclosure includes a stack 112 of battery cells in which battery cells 110 are stacked, a cooling plate 120 and a cooling unit 130. In addition, the battery module optionally includes a thermal pad 140.

The cooling plate 120 transfers the heat generated from the battery cells 110 to the exterior of the battery cells 110, while it is in thermal contact with the stack 112 of battery cells and fixed closely thereto. The cooling unit 130 receives heat from the cooling plate 120 and removes it. FIG. 2 illustrates a thermal pad 140 interposed between the cooling plate 120 and the cooling unit 130. However, the thermal pad 140 may be interposed between the stack 112 of battery cells and the cooling plate 120. In other words, the thermal pad 140 may be positioned in at least one site selected from the thermal interfaces formed in the stacked structure of the cooling unit 130, cooling plate 120 and the stack 112 of battery cells.

The battery cells 110 are preferably plate-like battery cells so as to provide a high stacking ratio in a limited space and are stacked and arranged so that one surface or both surfaces of one battery cell face the adjacent battery cell 110 to form a stack 112 of battery cells.

The battery cells 110 include electrode assemblies having cathode plates, separators and anode plates, each battery cell 110 has a plurality of cathodes tabs and anode tabs protruding out of the cathode plates and anode plates, and a cathode lead and an anode lead are connected electrically to the cathode tabs and anode tabs, respectively.

As a material for the cathode plate, aluminum is used generally. Otherwise, the cathode plate may be made of stainless steel, nickel, titanium, or aluminum or stainless steel surface-treated with carbon, nickel, titanium, silver, etc. Further, there is no limitation in materials for the cathode plate, as long as they cause no chemical change in secondary batteries and have high conductivity.

The cathode tab is provided in a partial region of the cathode plate and may be formed into a shape of extension from the cathode plate. Alternatively, the cathode tab may be formed by attaching a member made of a conductive material to a desired portion of the cathode plate through welding or the like. In addition, the cathode tab may be formed by applying a cathode material to a partial region of the outer circumferential surface of the cathode plate, followed by drying.

As a material for the anode plate corresponding to the cathode plate, copper is used generally. Alternatively, the anode plate may include stainless steel, aluminum, nickel, titanium, or copper or stainless steel surface-treated with carbon, nickel, titanium, silver, etc. In addition, an aluminum-cadmium alloy may be used.

The anode plate is also provided with an anode tab in a partial region thereof. As described above with reference to the cathode tab, the anode tab may be formed into a shape of extension from the anode plate. The anode tab may be formed by attaching a conductive member to a desired portion of the anode plate through welding or the like. In addition, the anode tab may be formed by applying an anode material to a partial region of the outer circumferential surface of the anode plate, followed by drying.

The cathode lead and the anode lead are electrically connected to the cathode tab provided in the cathode plate and the anode tab provided in the anode plate, respectively. Preferably, the cathode lead and the anode lead are connected with a plurality of cathode tabs and a plurality of anode tabs, respectively.

The cathode plate and the anode plate are coated with a cathode active material and an anode active material, respectively. For example, the cathode active material is a lithium-based active material and typical examples thereof include metal oxides, such as $LiCoO_2$, $LiNiO_2$, $LiMnO_2$, $LiMn_2O_4$, $LiFePO_4$ or $Li_{1+z}Ni_{1-x-y}Co_xM_yO_2$ (wherein $0 \leq x \leq 1$, $0 \leq y \leq 1$, $0 \leq x+y \leq 1$, $0 \leq z \leq 1$, and M is a metal such as Al, Sr, Mg, La, Mn, etc.) The anode active material is a carbonaceous active material and particular examples thereof include carbonaceous materials, such as crystalline carbon, amorphous carbon, carbon composites or carbon fibers, lithium metal, lithium alloys, or the like. The types and chemical compositions of the cathode active material and the anode active material may vary with the type of a secondary battery. Therefore, the above-listed examples are for illustrative purposes only.

The separator is not particularly limited, as long as it is a porous material. The separator may include a porous polymer membrane, such as a porous polyolefin membrane, polyvinylidene fluoride-hexafluoropropylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile styrene butadiene copolymer, polyimide, polyethylene terephthalate, polybutylene terephthalate, polyester, polyacetal, polyamide, polyether ether ketone, polyether sulfone, polyphenylene oxide, polyphenylene sulfide, polyethylene naphthalene, nonwoven membrane, membrane having a porous web structure or a combination thereof. The separator may include inorganic particles bound to either surface of both surfaces thereof.

Preferably, the inorganic particles are inorganic particles having a high dielectric constant of 5 or more. More preferably, the inorganic particles have a dielectric constant of 10 or more and low density. This is because such inorganic particles can transfer lithium ions moving in a battery with ease. Non-limiting examples of the inorganic particles having a high dielectric constant of 5 or more include $Pb(Zr,Ti)O_3$(PZT), $Pb_{1-x}La_xZr_{1-y}Ti_yO_3$(PLZT), $Pb(Mg_3Nb_{2/3})O_3$—$PbTiO_3$(PMN-PT), $BaTiO_3$, $HfO_2$, $SrTiO_3$, $TiO_2$, $Al_2O_3$, $ZrO_2$, $SnO_2$, $CeO_2$, $MgO$, $CaO$, $ZnO$, $Y_2O_3$ or a combination thereof.

The stack 112 of battery cells may have a structure in which a plurality of battery cells 110 is stacked simply with an insulation film interposed between the battery cells 110. In a variant, the stack 112 of battery cells may have a stack folding structure in which battery cells 110 are arranged at the top and/or bottom of the insulation film with an adequate interval and the insulation film is folded in one direction together with the battery cells 110 so that a battery cell 110 may be inserted between the folded insulation films. In another variant, the stack 112 of battery cells may be a pouch-type battery assembly. The embodiment shown in the drawing is a pouch-type battery assembly.

The thermal pad 140 is a member configured to allow the heat of the stack 112 of battery cells to be transferred efficiently to the cooling plate 120 and cooling unit 130, and may include an elastic material to improve the adhesion among the stack 112 of battery cells, cooling plate 120 and the cooling unit 130. For example, a heat transfer pad using silicone in combination with a thermal conductive material is prepared to realize elasticity and thermal conductivity at the same time. For example, such a structure may include carbon black, a copolymer, graphite, flame retardant and a stabilizer. The copolymer is a blend of a conductive polymer with a non-conductive polymer. Particular examples of the conductive polymer include any one of polyacetylene, polythiophene, polypyrrole, poly(p-phenyelene), poly(phenylenevinylene), poly(phenylene sulfide) and polyaniline, and particular examples of the non-conductive polymer include ethylene vinyl acetate (EVA), acrylic, butadiene rubber (BR), acrylonitrile butadiene rubber (NBR), styrene butadiene rubber (SBR), silicone polymers, siloxane polymers, or the like. The flame retardant may be any one of magnesium hydroxide ($Mg(OH)_2$) and aluminum hydroxide ($Al(OH)_3$). The stabilizer may be any one of magnesium oxide (MgO)

and zinc oxide (ZnO). The thermal pad 140 is configured to be used in a place where an instrumental disorder may occur due to the heat generated from a part so that the internal heat may be discharged effectively. Such thermal pads are produced by many production companies and a commercially available thermal pad may be used herein. It is preferred to use a thermal pad having excellent thermal conductivity, elasticity, flexibility and insulation property.

The cooling unit 130 may have a hollow tube-like shape and allows transfer of various types of coolants through the internal flow path. The cooling unit 130 may be provided in the form of a water cooling type cooling system or coolant-based cooling system generally known to those skilled in the art depending on the type of coolant. For example, the cooling unit may be a water cooling type heat exchange unit through which cooling water passes. As the cooling water passes, the cooling unit 130 maintains a cold state, and absorbs and removes the heat transferred through the cooling plate 120.

The cooling plate 120 functions to transfer the heat generated from the stack 112 of battery cells to the cooling unit 130. It is preferred that the cooling plate 120 is made of a highly thermal conductive material for the purpose of more efficient heat transfer. In addition, the cooling plate 120 according to the present disclosure is suggested for the purpose of weight lightening. Thus, the cooling plate 120 includes a metal plating layer 124 on the surface of a substrate 122 made of a synthetic resin. The metal plating layer 124 may be formed on both surfaces of either surface of the substrate 122.

The synthetic resin may be a commercially available plastic material. For example, it may be PC, PI, PET, PP, or the like. Preferably, the synthetic resin is any one of ABS, ABS-PC and PA resins which allow easy plating.

As well known in the art, ABS resin is derived from acrylonitrile, butadiene and styrene monomers. ABS resin generally has excellent impact resistance and toughness. Particularly, ABS resin has strength and rigidity of acrylonitrile polymer and styrene polymer in combination with toughness of polybutadiene rubber. Additionally, ABS resin shows an excellent electroplating adhesion value.

PC resin is a synthetic thermoplastic resin derived from a bisphenol and phosgene, or a derivative thereof. It is a linear polyester of carbonic acid and may be formed from a dihydroxyl compound and carbonate diester or transesterification. The polymerization may be carried out in an aqueous solution, at the interface or in a non-aqueous solution. PC resin is a kind of polymer having many desired properties. PC resin receives high praise by virtue of optical transparency and improved impact strength, high heat resistance and relative ductility at room temperature or lower.

A blend of PC with ABS (ABS-PC) is an amorphous thermoplastic blend which shows many desired properties including the advantages and/or properties of both PC and ABS. For example, when ABS is incorporated to a PC blend as an impact modifier, it provides ABS-PC having relatively high impact strength, heat resistance, excellent processability, weather resistance and ozone resistance, excellent ductility, electric resistance, aesthetic property, or the like. However, PC ingredient in ABS-PC typically has a lower electroplating adhesion value as compared to pure ABS.

Therefore, ABS resin is most preferred in terms of plating. Particularly, ABS resin shows excellent dimensional stability even before/after injecting molding or before/after plating, and thus is not affected by seasons or environment desirably. In addition, ABS resin has good plating ability and thus is preferred as a material forming the substrate of the cooling plate according to the present disclosure.

Preferably, the metal used herein has high thermal conductivity and low weight and may be at least one of nickel, copper and chromium. For example, in the case of copper, it has a thermal conductivity of about 400 W/m K. Therefore, when the metal plating layer 124 includes copper, it is possible to transfer the heat generated from the stack 112 of battery cells rapidly to the cooling unit 130, thereby increasing cooling efficiency. However, the scope of the present disclosure is not limited thereto.

When the thermal conductivity of a material is increased for the purpose of efficient heat radiation, it is possible to remove the heat accumulated in the material effectively and to prevent the material from being broken by sudden thermal impact. Each of the materials forming the substrate 122 and the metal plating layer 124 is selected considering the above.

Particularly, it is possible to improve thermal conductivity by adding a filler to the matrix in order to increase the thermal conductivity of the substrate 122. Thermal conduction in a non-metallic material, such as a polymer, is accomplished by vibration of phonons. In addition, atomic vibration occurring about any lattice point in a crystal is caused by the interaction between atoms affecting each other. Thus, it is known that such vibration does not retain in one atom but moves along the inner part of the material as a wave. Herein, it is known that main factors interrupting the heat transfer inside of a material are phonon-phonon scattering, boundary surface scattering, scattering caused by interfacial defects between a polymer and a filler, or the like. Since such scattering of phonons reduces thermal conductivity, it is required to minimize phonon scattering in order to obtain a polymer composite material having high thermal conductivity. To allow phonons to move easily inside of a polymer, a heat transfer path is important and it is known that main factors affecting the heat transfer path include a volume ratio, aspect ratio, alignment shape and particle size of reinforcing materials, as well as dispersive force in the polymer matrix material.

When using a substrate 122 in the form of a composite, preferred fillers are carbon nanotubes (CNTs). CNTs have an electroconductivity similar to that of copper and a thermal conductivity similar to that of diamond. CNTs have a strength about 100 times higher than that of iron steel. In addition, CNTs have excellent flexibility, low bulkiness and a high aspect ratio (300-1000), and thus show high electroconductivity and thermal conductivity. Thus, CNTs are very suitable as fillers for a polymer heat radiating composite material.

As described above, the cooling plate 120 according to the present disclosure includes a metal plating layer having high thermal conductivity in addition to a light resin material. Thus, the cooling plate shows improved heat diffusion capability and thermal conduction effect as compared to a cooling plate including a metal alone, thereby providing a battery module with enhanced cooling performance. Since the heat radiation property of the battery module is improved as mentioned above, the secondary battery is prevented from an overheating phenomenon and deterioration of performance, thereby providing increased efficiency of the battery module. As a result, it is possible to improve the product value of an electric vehicle or the like using the battery module.

Meanwhile, the substrate 122 may have a plurality of through-holes in order to radiate the heat generated from the stack 112 of battery cells effectively by extending the plated surface.

Figure 3:
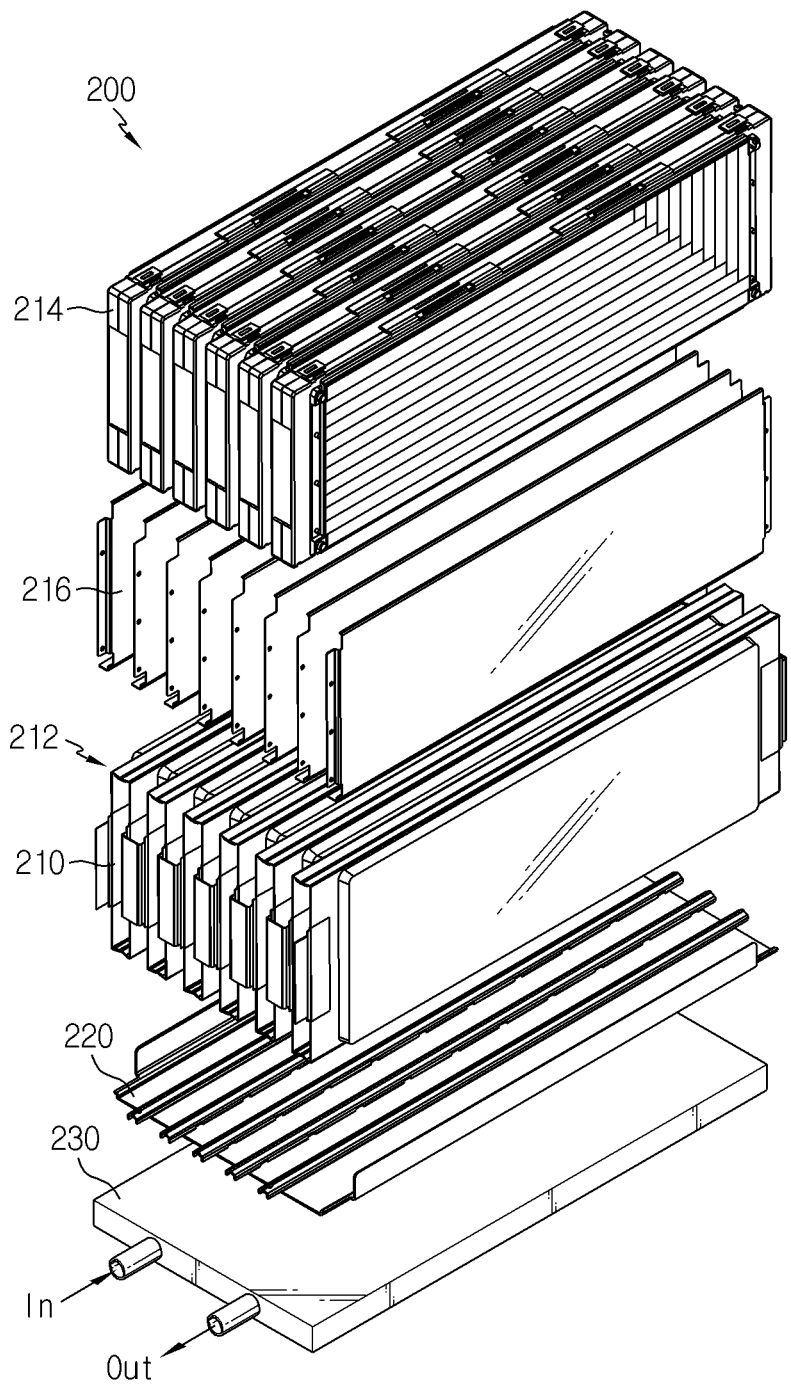
FIG. 3 is an exploded perspective view illustrating a battery module according to another embodiment of the present disclosure.
Figure 4:
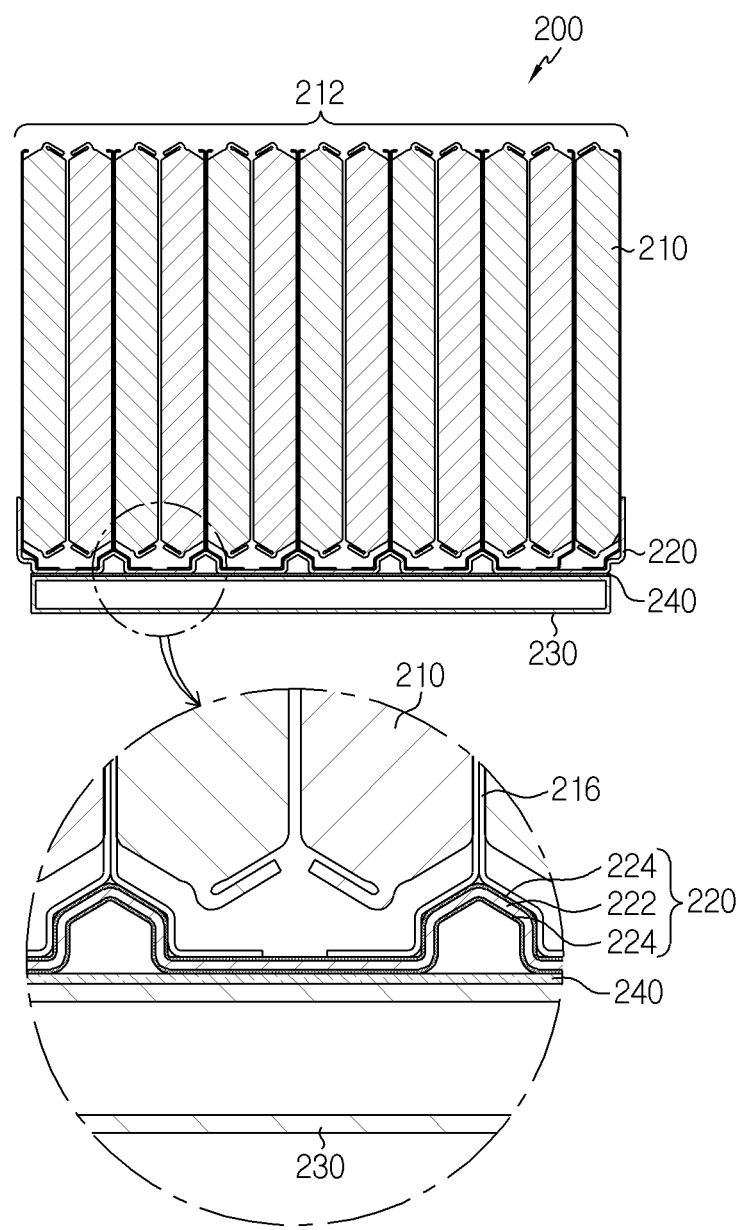
FIG. 4 is a schematic sectional view taken out of the section crossing the battery cells in the battery module shown in FIG. 3.

FIG. 3 is an exploded perspective view illustrating a battery module according to another embodiment of the present disclosure, and FIG. 4 is a schematic sectional view taken out of the section crossing the battery cells in the battery module shown in FIG. 3.

Particularly, the battery module 200 shown in FIG. 3 and FIG. 4 is a pouch-type battery cell. Such a pouch-type battery cell includes an electrode assembly having a cathode plate, separator and an anode plate sealed in a battery casing together with an electrolyte. The pouch-type battery cell has a plate-like shape which is a substantially rectangular parallelepiped whose thickness is smaller as compared to its width, as a whole. In general, such a pouch-type battery cell includes a pouch-type battery casing. The battery casing has a laminate sheet structure in which an outer coating layer formed of a polymer resin having excellent durability, a barrier layer formed of a metallic material that shows barrier property against moisture and air, and an inner sealant layer formed of a polymer resin capable of heat sealing are stacked successively. The casing in the pouch-type battery cell may have various structures. According to an embodiment, the pouch-type battery cell may have a structure formed by enclosing an electrode assembly with a battery casing made of a laminate sheet including a resin layer and a metallic layer and carrying out heat sealing of the outer circumferential surface of the battery casing. The heat sealed outer circumferential surface of the pouch-type battery cells fixes each battery cell 210 so that the battery cell may be fixed between cartridges forming the stack 212 of battery cells.

The battery module 200 includes a stack 212 of battery cells including such a pouch-type battery cell as a unit battery cell 210, a cooling plate 220 and a cooling unit 230. The cooling plate 220 has a structure which maximizes the contact surface with air or is processed to have an air flow path. Such a structure has an increased contact area with air and thus increases the effect of cooling the heat generated during charging/discharging. For example, the cooling unit 230 may be a water cooling type cooling unit having a cooling water inlet In and cooling water outlet Out.

As shown in FIG. 4 in detail, the stack 212 of battery cells is interposed at the interface of battery cells 210, and further includes cooling fins 216 whose ends protrude out of either lateral surface or both lateral surfaces of the stack 212 of battery cells.

As shown in the drawing, the battery cell 210 has a cathode terminal protruding out one side of the outer circumferential surface and an anode terminal protruding out the opposite side thereof. However, the cathode terminal and anode terminal may protrude out of one side of the outer circumferential surface. In any cases, the cooling fins 216 have their ends protruding in a direction perpendicular to the direction of protrusion of the cathode and anode terminals.

The structure of the cooling fin 216 is not particularly limited, as long as it is a thermal conductive thin member. For example, it is preferred to use a sheet of metallic material. Such a metallic material may be aluminum or an aluminum alloy having high thermal conductivity and low weight among metals, but is not limited thereto. For example, copper, gold, ceramics, copper alloys, etc. may be used.

At the protruding end of cooling fins 216, the cooling unit 230 is disposed with the cooling plate 220 interposed therebetween. In this manner, it is possible to make thermal contact between the battery cells 210 and the cooling unit 230 in the stack 212 of battery cells.

The protruding end of cooling fins 216 is bent so that it may be in close contact with the cooling plate 220. Particularly, the protruding end of cooling fins 216 is bent at an angle of about 90° so that it may be in close contact with the cooling plate 220. Of course, the cooling fins 216 may be bent in various forms, such as a reverse T-like shape, other than an L-like shape.

Such a structure increases the contact area with the cooling plate 220, thereby increasing thermal conduction efficiency and improving a cooling effect. As shown in the magnified view of FIG. 4, the cooling plate 220 may be processed to have corrugations like a corrugated cardboard so as to form an air flow path between the cooling plate 220 and the cooling unit 230. In this manner, it is possible to carry out heat transfer and cooling effectively.

In addition, the above structure also functions to receive the end of cooling fins 216 stably. Thus, the end of cooling fins 216 is inserted to a concave portion of the air flow path, and thus can be inhibited from undesired movement.

The cooling plate 220 receives heat from the battery cells 210 through the cooling fins 216 and transfers the heat to the cooling unit 230 to carry out cooling. According to an embodiment, the thermal pad 240 is interposed between the cooling plate 220 and the cooling unit 230. According to another embodiment, the thermal pad 240 may be inserted between the protruding end of the cooling fins 216 and the cooling plate 220.

The cooling unit 230 has a coolant flow path therein and carries out cooling by cooling water flowing through the coolant flow path. In other words, the heat generated from the battery cells 210 is transferred to the cooling plate 220 and the cooling unit 230 through the cooling fins 216 and the heat is removed by indirect water cooling of the cooling unit 230 so that the temperature of the battery module 200 may be controlled.

In brief, the battery module 200 has a structure in which the cooling fins 216 are interposed between the battery cells 210 so that the cooling fins 216 may be cooled by the cooling unit 230 upon the heat generation from the battery cells 210. Thus, it is possible to improve the cooling efficiency through a simple cooling structure.

The cooling plate 220 is substantially the same as the above-described cooling plate 120 but is different from the cooling plate 120 in that the cooling plate 220 is processed to have an air flow path. The cooling plate 220 also includes a metal plating layer 224 on the surface of a substrate 222 made of a synthetic resin. Thus, a resin material is press molded or injection molded to obtain a substrate having an air flow path, and the metal plating is carried out to provide the cooling plate 220. The metal plating layer 224 may be formed on either surface or both surfaces of the substrate 222.

Hereinafter, a method for manufacturing a cooling plate will be explained in detail.

Figure 5:
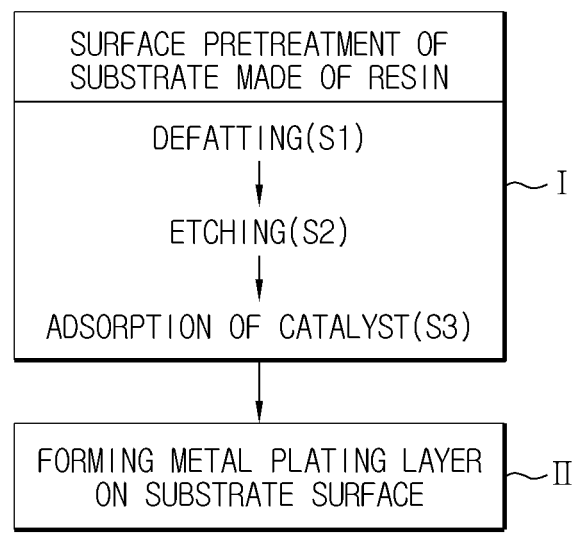
FIG. 5 is a flow chart illustrating a method for manufacturing a cooling plate according to the present disclosure.

FIG. 5 is a flow chart illustrating the method for manufacturing a cooling plate according to an embodiment of the present disclosure.

Referring to FIG. 5, the surface of a substrate made of a synthetic resin is pretreated first (step I).

As described above, the synthetic resin may be any one of ABS, ABS-PC and PA resins. When an air flow path is formed as shown in the cooling plate 220 of FIG. 3, the cooling plate is prepared by carrying out press molding or injection molding of the synthetic resin to provide such a shape.

Press molding is a molding process including introducing a substrate material to a mold and applying pressure thereto.

It is applied to a thermosetting resin. Injection molding is a molding process including pushing a molten resin solution to a plunger and filling a mold with the molten resin solution through a nozzle. It can be applied to both a thermoplastic resin and a thermosetting resin.

Figure 6:
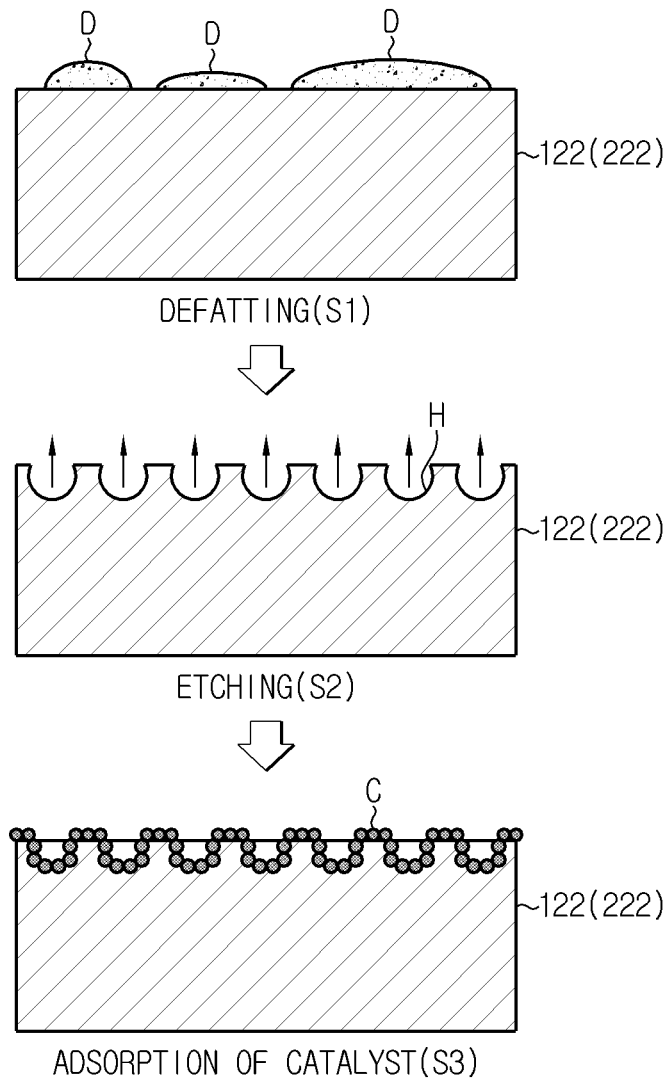
FIG. 6 is a stepwise view illustrating a pretreating step of the method for manufacturing a cooling plate according to the present disclosure.

Pretreatment step (I) may include the following three steps, which will be explained in more detail with reference to FIG. 6. FIG. 6 is a stepwise view illustrating a pretreating step of the method for manufacturing a cooling plate according to the present disclosure.

First, a defatting step (S1) is carried out.

Defatting is carried out in order to remove oil or dirt D attached to the surface of the substrate 122, 222 and may use a solvent defatting process, alkaline defatting process, acid defatting process, or the like. When defatting is performed incompletely, defects in adhesion of a metal plating layer in the subsequent step or stain may occur. Thus, such processes are used preferably in combination to carry out defatting completely. The defatting mechanism is based on 1) wetting and infiltration of the ingredients of a defatting solution, 2) emulsion and dispersion, 3) saponification, 4) dissolution, and 5) mechanical peeling.

The solvent defatting (preliminary defatting) includes dissolving and removing oil- and fat-type dirt D attached to the surface of the substrate 122, 222 by using an organic solvent, such as trichloroethylene. The solvent defatting is suitable for removing oil and fat attached to the surface of the substrate in a large amount and the dirt may be diluted by the solvent. However, the solvent defatting is not complete and thus is suitable for preliminary cleaning. Alkaline defatting is to remove oil (cutting oil, press oil, or the like) attached to the surface of the substrate. When an alkali is bound with saponifiable oil, water-soluble salt is produced. Alkaline defatting is a defatting process based on such saponification. In general, the alkaline defatting bath uses, as an inorganic ingredient, an alkaline compound, such as sodium hydroxide, sodium carbonate, sodium hydrogen carbonate, sodium orthometasilicate or sodium phosphate, and a small amount of surfactant is added thereto.

Herein, the substrate 122, 222 is made of a resin material and is prepared by press molding or injection molding. Thus, dirt D of oil and fat on the substrate is not severe and defatting using sulfuric acid is sufficient. When the substrate is dipped in sulfuric acid at 50-60° C. for about 2-3 minutes, it is possible to remove dirt. Such defatting using sulfuric acid improves wetting to water in the subsequent etching step, and thus is more preferred.

Next, an etching step S2 is carried out.

Etching means acid washing using sulfuric acid or hydrochloric acid to remove foreign material causing defects in adhesion of a plating layer or to form surface irregularities chemically on the surface of the substrate. The etching step is carried out at room temperature or under warming.

When the synthetic resin is ABS resin, the etching step uses a mixture of anhydrous chromic acid with sulfuric acid so that anchor holes H may be formed uniformly on the surface of the substrate 122, 222. The etching step may be carried out under the condition of dipping at a temperature of 69-71° C. for about 4-5 minutes. The mixture of anhydrous chromic acid with sulfuric acid elutes the butadiene ingredients of ABS resin to form anchor holes H having a uniform size and uniform distribution on the surface of the substrate made of a synthetic resin. The anchor holes H allow stable reception of a catalyst functioning as a seed upon the plating on the surface of the substrate made of a synthetic resin and increases the adhesion strength between a plating layer and a resin to enhance adhesion of a plating layer. Thus, the anchor holes minimize defects in productivity and plating.

It is possible to use an etching solution containing a permanganate salt instead of the mixture of anhydrous chromic acid with sulfuric acid. The etching solution may include a permanganate salt, phosphoric acid and sulfuric acid. In this case, the etching step may be carried out at a temperature of 65-70° C. for 3-5 minutes. A permanganate salt is a strong oxidizing agent and thus oxidizes butadiene to produce a carboxyl group and a carbonyl group. Sulfuric acid weakens bonding in ABS, performs swelling and allows a permanganate salt to oxidize butadiene with ease. Phosphoric acid reduces etching time and allows rapid etching.

It is generally known that PC resin has lower plating adhesion as compared to ABS resin. Thus, etching of PC resin is different from that of ABS. For example, etching is carried out through a first etching step of swelling the surface of PC by using dichromic acid and acetone and a second etching step using anhydrous chromic acid and sulfuric acid.

When using PC resin, it is possible to carry out plating without etching.

The last step of pretreatment is an adsorption of catalyst step S3. Adsorption of catalyst is essential since it is a seed of electroless plating.

The catalyst may include palladium (Pd), tin (Sn) or silver (Ag), and Sn/Pd colloid is used preferably. For the purpose of adsorption of catalyst, tin chloride, a mixture of palladium chloride and hydrochloric acid may be used. After adsorption of catalyst step S3, a uniform catalyst layer C is formed on the surface of the substrate 122, 222 so that it may function as a seed of the subsequent plating step. After the adsorption of the Sn/Pd colloid, reduction is carried out to dissolve the tin salt, thereby producing palladium metal.

Referring to FIG. 5, after the pretreatment step I, step II of carrying out metal plating is performed to form a metal plating layer on the surface of the substrate. Primarily, this is based on electroless plating.

Electroless plating is a method of forming a plating layer through the precipitation of a material caused by spontaneous redox reaction of materials in a plating solution. The electroless plating solution includes a metal salt providing a metal ion, complexing agent, reducing agent, or the like and may further include a pH modifier, solution stabilizer, surfactant, or the like. Similarly to electroplating, electroless plating is carried out in a plating solution, and thus shows excellent process continuity with the subsequent electroplating and allows easy infiltration of a liquid plating solution into a pattern. Thus, it is possible to form a plating layer having excellent properties, including uniform step coverage.

As described above, the metal may be at least one of nickel, copper and chromium. For example, it is possible to form a copper plating layer alone, or to form a nickel plating layer alone. Otherwise, a plating layer may be formed by using a combination of such metals. For example, a nickel/chromium dual layer may be formed or plating layer may be carried out in the order of copper, nickel and chromium.

According to an embodiment, the step (II) of carrying out metal plating is electroless nickel plating. In this case, the plating solution that may be used includes a mixed solution of nickel sulfate, malic acid, succinic acid, sodium hypophosphate and thiourea. Such a plating solution is based on the principle of forming a plating layer while nickel ions are reduced by electrons released upon the oxidation of the reducing agent in the plating solution on the surface of catalytically activated palladium. Nickel sulfate is a main ingredient of plating and is a source of nickel ions. When the concentration decreases, gloss is degraded, the plating thickness is insufficient and the plating rate is slow. Thus, the concentration is determined considering this.

Nickel plating may be carried out by bilayer, trilayer or multilayer plating.

Multilayer plating refers to a nickel plating process which includes applying 2-3 layers of nickel plating layers having a different sulfur content and carrying out chromium plating thereon to obtain high anti-corrosive property.

In the bilayer plating, the first layer includes non-bright or semi-bright nickel plating containing no sulfur in order to improve anti-corrosive property, and the second layer includes bright nickel plating containing about 0.05% of sulfur (semi-bright→bright nickel). When a plating layer is subjected to corrosive environment, a bright plating layer has a lower potential as compared to a non-bright or semi-bright nickel plating layer, and thus corrosion extends laterally on the bright plating layer, thereby preventing pitting corrosion. In general, the thickness ratio between the first plating layer and the second plating layer is about 7:3-8:2, and thus the first plating layer is thicker than the second plating layer.

Tri-layer nickel plating includes plating of a thin intermediate layer having a thickness of several micrometers and a high sulfur content in addition to the above-mentioned bi-layer nickel plating (generally, S=about 0.2%, thickness: about 0.3-1 µm). The third intermediate layer plating is also called tri-nickel or nickel strike plating (semi-bright→strike nickel→bright nickel). In this case, anti-corrosive property is improved but the plating process becomes complicated. The tri-nickel layer has a lower natural potential as compared to the semi-bright plating layer and bright plating layer (semi-bright>bright>high-sulfur content nickel strike). In addition, when corrosion reaches the semi-bright layer, the weakest strike layer is corroded first of all so that corrosion may not proceed in the depth direction. Therefore, it is possible to inhibit corrosion in the direction toward the substrate and to provide excellent anti-corrosive property.

The plating solution that may be used for such multi-layer nickel plating includes nickel sulfate and boric acid or nickel chloride added thereto as a buffering agent, optionally with a brightening agent. The plating solution may have a temperature of 55-65° C. and a pH of 3.5-4.5. In addition, since the electroless plating allows metallization of the surface and current flow, it is possible to carry out electroplating from the second layer.

Nickel chloride improves the electroconductivity of a plating solution and provides improved adhesion and smoothness, and thus broad current density. However, an excessive amount of nickel chloride causes generation of pit and curing of a coating film, while an insufficient amount of nickel chloride causes degradation of gloss. Thus, the concentration of nickel chloride is determined considering this. Boric acid functions as a pH buffering agent and also serves to extend a range of gloss, to improve smoothness, to reduce internal stress, to improve uniform electrodeposition and to reduce burning. However, an insufficient amount of boric acid makes a plating color turbid and causes a severe pH variation. Thus, the concentration of boric acid is determined considering the above.

Brighteners for bright nickel plating may be classified into a primary brightener and a secondary brightener. The primary brightener protects the second brightener, retains the gloss of the substrate, and makes a strong plating layer caused by internal stress softer. An insufficient amount of primary brightener makes a plating layer brittle and increases internal stress. Once the brightener is added, it is used for a long time. Particular examples of the brightener include 1,3,6-naphthalene, saccharine, sodium sulfonate, sulfonamide, G-1, Green label-II, SL-21 and Udylite #63.

The secondary brightener makes a surface bright like glass bubbles. In bright plating, pit may be generated easily when plating is carried out at a high speed in a low-pH bath. Thus, it is required to use a pit inhibitor and particular examples thereof include gelatin, butenediol, coumarine, formalin, G2, MSL-II, SL-22 and Udylite #61.

The brightener for semi-bright nickel plating may include a combination of 1,4-butenediol, formalin, coumarine, or the like.

In the case of strike nickel plating, it is possible to use a plating solution containing nickel chloride to which hydrochloric acid is added.

According to another embodiment, the step (II) of carrying out metal plating may be copper electroless plating. The electroless copper plating solution may include a copper metal salt that provides copper ions. Particular examples of the copper metal salt include copper sulfate, copper chloride, copper nitrate and a combination thereof. The electroless copper plating solution may include a reducing agent which reduces copper ions provided from the copper metal salt. Particular examples of the reducing agent may include formaldehyde, paraformaldehyde, glyoxylic acid, hypophosphate, sodium hydrogen borate and a combination thereof. The electroless copper plating solution may include a complexing agent which forms a complex with the copper ion provided from the copper metal salt to facilitate reduction of copper. Particular examples of the complexing agent may include Rochelle salt, ethylene diamine tetraacetic acid, hydroxyethyl ethylene triacetate, cyclohexanediamine tetraacetate, diethylene triamine pentaaceate, tetrakis(2-hydroxypropyl)ethylene diamine and a combination thereof. The electroless copper plating solution may further include additives for modifying nucleation at the initial stage of the reaction, plating rate, stability, plating stress, color and ductility. For example, the electroless copper plating solution may further include a catalyst, pH modifier and/or an accelerator. The electroless copper plating solution may further include a catalyst. The catalyst may include nickel chloride, nickel sulfate or a combination thereof. For example, the catalyst may include nickel chloride hexahydrate. The electroless copper plating solution may further include a pH modifier. The pH modifier may include sodium hydroxide, lithium hydroxide, potassium hydroxide, tetramethylammonium hydroxide, tetraethylammonium hydroxide, hydrosulfonate and a combination thereof. For example, the pH modifier may further include sodium hydroxide. The electroless copper plating solution may further include an accelerator configured to accelerate plating. The accelerator may include sodium carbonate, phenylmercury aceate, mercury aceate, mercaptobenzotriazole, benzotriazole, meso-2,3-dimercaptosuccinic acid, 1,3-diphenyl-2-thiourea, thiourea, pyridine and a combination thereof. For example, the accelerator may include sodium carbonate.

The electroless copper plating solution may further include an anionic surfactant, cationic surfactant and/or a stabilizer.

The surfactant may function to reduce interfacial energy significantly by being dissolved into a liquid or by being adsorbed to the interface and to perform wetting, emulsification, dispersing, foaming, solubilization and washing, or may serve to reduce the interfacial tension significantly.

Particular examples of the anionic surfactant may include carboxylate, sulfonate, sulfate ester, phosphate ester, phosphonate, alkylbenzene sulfonate, α-olefin sulfonate, alkylsulfonate ester, alkylether sulfonate ester, alkane sulfonate and a combination thereof. For example, the anionic surfactant may be an ammonium sulfonate-based surfactant.

Particular examples of the stabilizer may include potassium ferrocyanide, sodium cyanide, potassium cyanide, thalium nitride, sodium thiosulfate, 2,2'-bipyridyl, 1,10-phenanthroline, 2,9-dimethyl-1,10-phenanthroline, polyalkylene glycol and a combination thereof.

According to still another embodiment, the step (II) of carrying out metal plating may be chromium electroless plating.

According to still another embodiment, the step (II) of carrying out metal plating may be performed by copper plating, nickel plating and chromium plating, successively. The copper plating may be carried out by electroless plating and then electroplating may be carried out. Otherwise, electroless nickel plating may be carried out before copper plating to form a base layer for copper plating, and then electroplating may be carried out from copper plating. Such plating is well known as decorative chromium plating. Particularly, when carrying out chromium plating finally, it is possible to prevent discoloration.

According to still another embodiment, the step (II) of carrying out metal plating may be performed by copper plating, semi-bright nickel plating, bright nickel plating, microporous nickel plating and chromium plating, successively.

Figure 7:
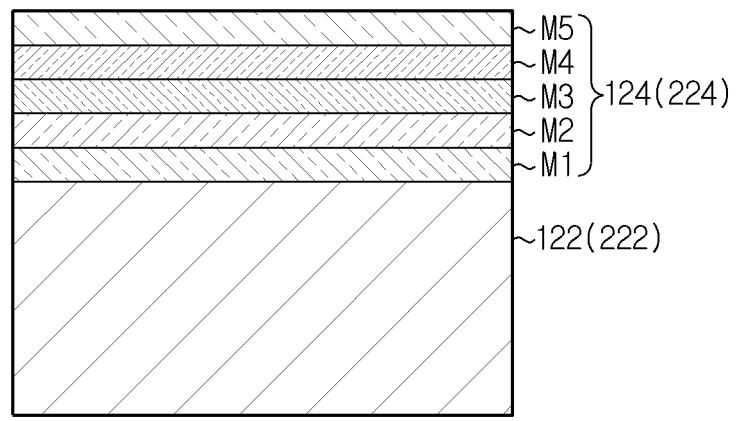
FIG. 7 shows a multilayer plating structure of a cooling plate according to another embodiment of the present disclosure.

FIG. 7 shows a multilayer plating structure of a cooling plate according to the above-mentioned plating process. Referring to FIG. 7, a metal plating layer 124, 224 including a copper plating layer M1, semi-bright nickel plating layer M2, bright nickel plating layer M3, microporous nickel plating layer M4 and chromium plating layer M5 successively is formed on the substrate 122, 222.

When severe environment is used, the nickel plating layer may be a dual layer of semi-bright nickel-bright nickel as described above. However, when chromium plating is carried out after semi-bright nickel→bright nickel→microporous nickel plating is carried out, it is possible to improve anti-corrosive property significantly. Herein, the chromium plating may be performed by microporous chromium plating. Particularly, nickel strike plating containing non-conductive microparticles may be carried out and then conventional chromium plating may be performed to about 0.25 μm, or a chromium plating solution containing microparticles may be used.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A cooling plate interposed between a cooling unit that is in thermal contact with battery cells on at least one surface of a stack of battery cells and the battery cells, the cooling plate comprising a metal plating layer on the surface of a substrate made of a synthetic resin.

2. The cooling plate according to claim 1, wherein the synthetic resin is any one of ABS, ABS-PC and PA resins and the metal is at least one of nickel (Ni), copper (Cu) and chromium (Cr).

3. The cooling plate according to claim 1, wherein the substrate of the cooling plate is processed so that an air flow path may be formed.

4. A battery module comprising:
   a stack of battery cells in which battery cells are stacked;
   a cooling unit that is in thermal contact with the battery cells on at least one surface of the stack of battery cells; and
   a cooling plate interposed between the cooling unit and the battery cells,
   wherein the cooling plate comprises a metal plating layer on the surface of a substrate made of a synthetic resin.

5. The battery module according to claim 4, wherein the synthetic resin is any one of ABS, ABS-PC and PA resins and the metal is at least one of nickel (Ni), copper (Cu) and chromium (Cr).

6. The battery module according to claim 4, wherein the substrate of the cooling plate is processed so that an air flow path may be formed.

7. The battery module according to claim 4, which further comprises a thermal pad provided on a thermal interface formed among the stack of battery cells, cooling unit and the cooling plate.

8. The battery module according to claim 4, which further comprises cooling fins interposed at the interface of the battery cells and having their ends protruding out of either lateral surface or both lateral surfaces of the stack of battery cells, and the cooling plate is mounted to the protruding ends of the cooling fins.

9. The battery module according to claim 8, wherein the battery cells have cathode terminals and anode terminals protruding out of one side of the outer circumferential surface thereof, or have cathode terminals protruding out of one side of the outer circumferential surface and anode terminals protruding out of the opposite side of the outer circumferential surface, and the ends of the cooling fins protrude in a direction perpendicular to the protruding direction of the cathode terminals and anode terminals.

10. The battery module according to claim 4, wherein the plate-like battery cells are pouch-type battery cells having a structure in which electrode assemblies are enclosed in a battery casing of a laminate sheet including a resin layer and a metal layer and the outer circumferential surface of the battery casing is sealed by heat sealing, wherein the heat sealed outer circumferential surface of the pouch-type battery cells fix each of the battery cells so that it may be fixed between cartridges forming the stack of battery cells.

11. A method for manufacturing a cooling plate interposed between a cooling unit that is in thermal contact with battery cells on at least one surface of a stack of battery cells and the battery cells, the method comprising the steps of:
   pretreating the surface of a substrate made of a synthetic resin; and
   carrying out metal plating to form a metal plating layer on the surface of the substrate.

12. The method for manufacturing a cooling plate according to claim 11, wherein the synthetic resin is any one of ABS, ABS-PC and PA resins and the metal is at least one of nickel (Ni), copper (Cu) and chromium (Cr).

13. The method for manufacturing a cooling plate according to claim 11, which comprises a step of carrying out press molding or injection molding to form an air flow path in the substrate.

14. The method for manufacturing a cooling plate according to claim 11, wherein the pretreating step is a defatting, etching and adsorption of catalyst step.

15. The method for manufacturing a cooling plate according to claim 14, wherein the catalyst is Sn/Pd colloid.

16. The method for manufacturing a cooling plate according to claim 14, wherein the synthetic resin is ABS resin, and the etching step is carried out by eluting butadiene ingredient out of the ABS resin to form anchor holes on the surface of the synthetic resin.

17. The method for manufacturing a cooling plate according to claim 14, wherein the defatting step uses sulfuric acid, the etching step uses a mixture of anhydrous chromic acid with sulfuric acid, and the adsorption of catalyst step uses a mixture of tin chloride, palladium chloride and hydrochloric acid.

18. The method for manufacturing a cooling plate according to claim 17, wherein the metal plating step is carried out by electroless nickel plating and a mixture of nickel sulfate, malic acid, succinic acid, sodium hypophosphate and thiourea is used as a plating solution.

19. The method for manufacturing a cooling plate according to claim 17, wherein the metal plating step is carried out by copper plating, nickel plating and chromium plating, successively.

20. The method for manufacturing a cooling plate according to claim 17, wherein the metal plating step is carried out by copper plating, semi-bright nickel plating, bright nickel plating, microporous nickel plating and chromium plating, successively.

\* \* \* \* \*